(12) United States Patent
Tian

(10) Patent No.: US 9,673,432 B2
(45) Date of Patent: Jun. 6, 2017

(54) BATTERY CASE AND ELECTRIC SKATEBOARD USING SAME

(71) Applicant: THAOXIANG ELECTRIC ENERGY (KUNSHAN) CO., LTD., Kunshan, Jiangsu (CN)

(72) Inventor: Yu Tian, Jiangsu (CN)

(73) Assignee: YUNEEC TECHNOLOGY CO., LIMITED, Kowloon (CN)

( * ) Notice: Subject to any disclaimer, the term of this patent is extended or adjusted under 35 U.S.C. 154(b) by 0 days.

(21) Appl. No.: 14/394,794

(22) PCT Filed: Dec. 20, 2013

(86) PCT No.: PCT/CN2013/090076
§ 371 (c)(1),
(2) Date: Oct. 16, 2014

(87) PCT Pub. No.: WO2015/007064
PCT Pub. Date: Jan. 22, 2015

(65) Prior Publication Data
US 2016/0276639 A1  Sep. 22, 2016

(30) Foreign Application Priority Data
Jul. 19, 2013 (CN) .................... 2013 2 0433438 U

(51) Int. Cl.
*H01M 2/10* (2006.01)
*A63C 17/12* (2006.01)
(Continued)

(52) U.S. Cl.
CPC .......... *H01M 2/1083* (2013.01); *A63C 17/01* (2013.01); *A63C 17/12* (2013.01); *A63C 17/26* (2013.01);
(Continued)

(58) Field of Classification Search
CPC ................................ A63C 17/01; A63C 17/12
See application file for complete search history.

(56) References Cited

U.S. PATENT DOCUMENTS 5,330,026 A * 7/1994 Hsu ........................ A63C 17/01
180/181
7,293,622 B1 * 11/2007 Spital ..................... A63C 17/12
180/180
(Continued)

FOREIGN PATENT DOCUMENTS

AU   2013101699 A4   1/2015
CN     201262965 Y   6/2009
(Continued)

OTHER PUBLICATIONS

International Search Report dated Apr. 16, 2014 issued in International Patent Application No. PCT/CN2013/090076.
(Continued)

*Primary Examiner* — Brian Swenson
(74) *Attorney, Agent, or Firm* — Chun-Ming Shih; HDLS IPR Services

(57) ABSTRACT

A battery case includes a bottom plate part and two side plate parts extending oppositely from the bottom plate part, wherein each of the side plate parts has at least one opening, in which an elastic element is arranged. An electric skateboard includes a bearing deck, wheels mounted on both ends of the bearing deck, an electric motor mounted under the bearing deck, and said battery case which is mounted under the bearing deck. The side plate parts of the battery case have openings in which elastic elements are arranged. Therefore, when pressure is exerted by the bearing deck to the battery case, the opening of the battery case is able to squeeze the elastic element so that the battery case can undergo an elastic deformation easily.

6 Claims, 2 Drawing Sheets

(51) Int. Cl.
*A63C 17/26* (2006.01)
*A63C 17/01* (2006.01)

(52) U.S. Cl.
CPC ....... *H01M 2/1016* (2013.01); *A63C 2203/12* (2013.01); *H01M 2220/20* (2013.01)

(56) References Cited

U.S. PATENT DOCUMENTS

| | | | |
|---|---|---|---|
| 8,662,508 B2* | 3/2014 | Grossman | B62K 3/002 280/11.203 |
| 2003/0168273 A1 | 9/2003 | Ducharme et al. | |
| 2004/0262056 A1* | 12/2004 | Ying | A63C 17/01 180/65.1 |
| 2005/0006158 A1* | 1/2005 | Tsai | A63C 17/12 180/167 |
| 2006/0032682 A1* | 2/2006 | Hillman | A63C 17/12 180/65.1 |
| 2009/0236811 A1* | 9/2009 | Lewis | A63C 17/0093 280/87.042 |
| 2013/0081891 A1* | 4/2013 | Ulmen | A63C 17/12 180/181 |
| 2016/0059108 A1* | 3/2016 | Demolder | A63C 17/12 701/22 |
| 2016/0067588 A1* | 3/2016 | Tan | A63C 17/12 180/181 |
| 2016/0256767 A1* | 9/2016 | Cerboneschi | A63C 17/12 |

FOREIGN PATENT DOCUMENTS

| | | |
|---|---|---|
| CN | 201623190 U | 11/2010 |
| CN | 202933467 U | 5/2013 |
| CN | 203389315 U | 1/2014 |
| JP | 2006-008131 A | 1/2006 |

OTHER PUBLICATIONS

Written Opinion of the International Searching Authority dated Apr. 16, 2014 issued in International Patent Application No. PCT/CN2013/090076.

English specification and drawings of the corresponding European patent application No. 13886143.0 (not published yet).

* cited by examiner

BATTERY CASE AND ELECTRIC SKATEBOARD USING SAME

CROSS REFERENCE TO RELATED APPLICATION

The present application is the U.S. national stage application of International Application PCT/CN2013/090076, filed Dec. 20, 2013. The International Application claims priority of Chinese Patent Application 201320433438.X, filed Jul. 19, 2013, the contents of which are incorporated herein by reference in their entireties.

FIELD OF INVENTION

The present invention relates to a battery case and an electric skateboard using the same, especially to a battery case used for an electric skateboard and an electric skateboard using same.

PRIOR ARTS

As we all know, the skateboard for entertainment or sports is capable of bearing the weight of at least one person. The deck of the skateboard for bearing a person is usually elastic. The middle part of the deck elastically deforms downwards when a sportsman steps onto the skateboard, and restores its shape when the sportsman steps down. However, for an electric skateboard, since the battery pack and the battery case holding the battery pack ought to be mounted under the deck, it is inevitable to influence the elastic deformation of the deck. In some worse cases, the elastic deformation of the deck may even damage the battery case. In order to avoid this risk, some manufacturers divide the battery case into two and mount them at the two ends of the deck respectively, so that the influence of the battery cases on the elastic deformation of the deck is reduced to the greatest extent. However, it is difficult to manage the battery under this arrangement, and the problem of the unbalance of the battery may emerge. The battery may become unreliable and the life of the battery may be shortened.

Therefore, it is necessary to make improvement to it.

SUMMARY OF THE INVENTION

The technical problem this invention intends to solve is to provide a battery case with better performance of its elastic deformation.

The technical solution of this invention is as follows:

A battery case for an electric skateboard, comprising a bottom plate part and two side plate parts extending oppositely from the bottom plate part, each of the side plate parts has at least one opening, in which an elastic element is arranged.

Preferably, the elastic element is integrated with the side plate part.

Preferably, the elastic element is assembled on the side plate part.

Preferably, the elastic element comprises a main body part and cylindrical bodies extruding from the main body part and having protrusions, wherein both sides of the opening have through holes, and the main body part is inserted into the through holes and is fixed by the protrusions.

Preferably, a connecting part for connecting with the electric skateboard is mounted on the side plate part.

Preferably, the battery case comprises two end plate parts, which extend respectively from the two ends of the bottom plate part and connect respectively with the two side plate parts.

Another technical problem this invention intends to solve is to provide an electric skateboard with better performance of its elastic deformation.

The technical solution of this invention is as follows:

An electric skateboard, comprising a bearing deck, wheels mounted on both ends of the bearing deck, and an electric motor mounted under the bearing deck, further comprises the battery case mentioned above, which is mounted under the bearing deck.

Preferably, a connecting part for connecting with the bearing deck of the electric skateboard is mounted on the side plate part.

Preferably, the battery case comprises two end plate parts, which extend respectively from the two ends of the bottom plate part and connect respectively with the two side plate parts.

This invention has the following advantageous effects: the battery case of this invention has side plate parts with openings, and elastic elements are arranged therein. Therefore, when pressure is exerted by the bearing deck to the battery case, the opening of the battery case is able to squeeze the elastic element so that the battery case can undergo an elastic deformation easily.

DETAILED DESCRIPTION OF THE PREFERRED EMBODIMENT

Figure 1:
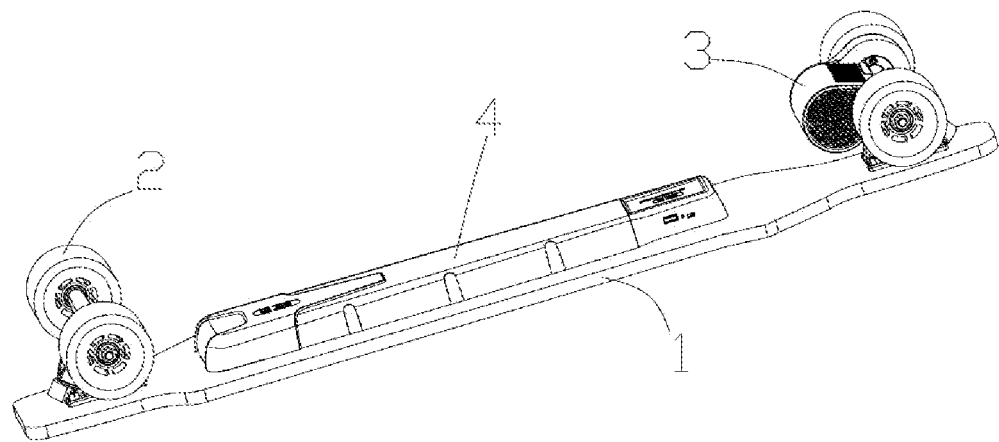
FIG. 1 is the schematic view of the electric skateboard of this invention.

Referring to FIG. 1, the electric skateboard of this invention comprises an elongated bearing deck 1, four wheels 2 mounted on both ends of the bearing deck 1, an electric motor 3 mounted under the bearing deck 1 and an elongated battery case 4 mounted under the middle of the bearing deck 1. A battery pack for supplying electricity to the electric motor 3 can be installed in the battery case 4.

Figure 2:
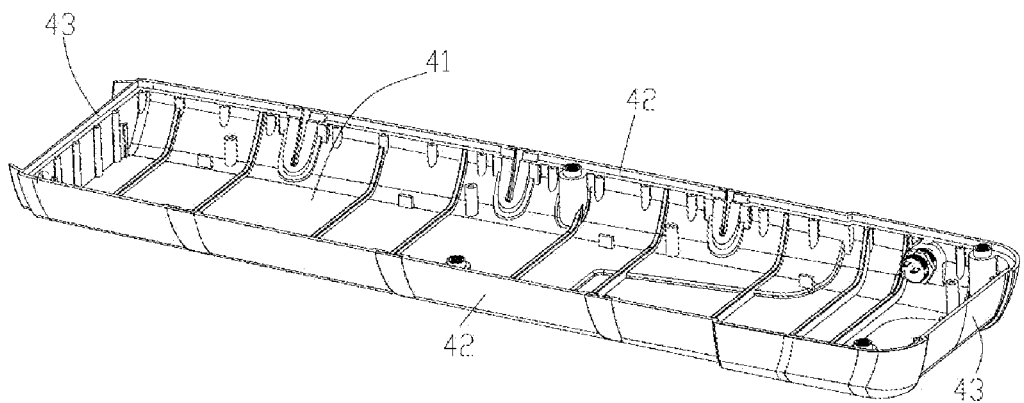
FIG. 2 is the schematic view of the battery case of the first embodiment of this invention.
Figure 3:
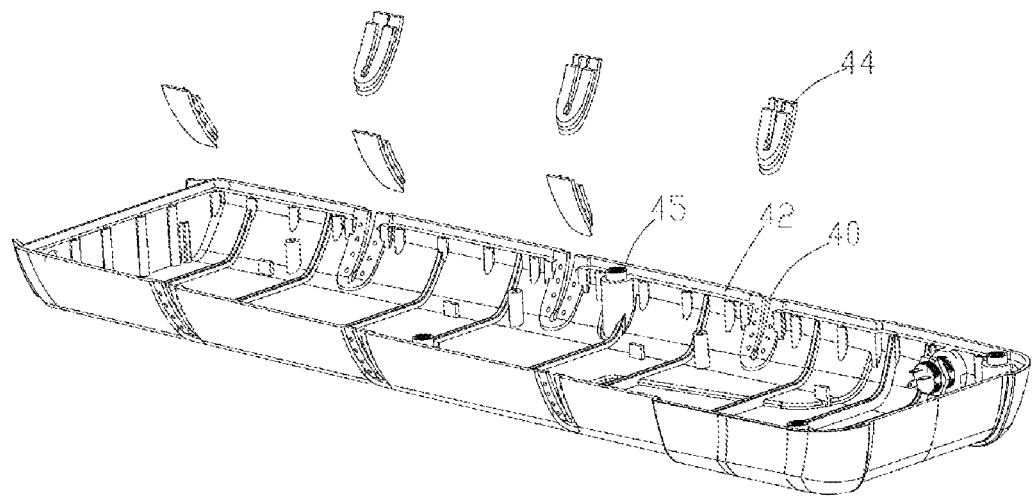
FIG. 3 is the exploded view of the battery case of the first embodiment of this invention.

FIGS. 2 and 3 show the battery case of the first embodiment of this invention. In this embodiment, the battery case 4 comprises a bottom plate part 41 and two side plate parts 42 extending oppositely from the bottom plate part 41 and two end plate parts 43, which extend respectively from the two ends of the bottom plate part 41 and connect respectively with the two side plate parts 42. Between the two side plate parts 42, there forms a cavity where the battery pack (not shown) can be installed. The two end plate parts 43 on both ends can form the cavity into a cavity with both ends sealed such that when the battery case 4 is mounted on the electric skateboard, the battery pack can be packaged better and have damp-proof function.

Referring to FIG. 3, each side plate part 42 has at least one opening 40, here in this embodiment, 3 openings, while in other embodiments, it can have other numbers of openings.

Each opening 40 is configured with an elastic element 44. The material of the elastic element 44 can be chosen from elastic plastic materials. In this embodiment, the battery case 4 is shaped by injection molding in the mold. Afterwards, the elastic element 44 is shaped by overmolding, so that the battery case 4 and the elastic element 44 are integrated without any assembling required. After shaping, some part of the elastic element 44 fills inside the opening 40. Thus, when receiving the downward pressure exerted by the bearing deck 1, the battery case 4 deforms downwards, and the opening 40 becomes smaller under this pressure. The closer the opening 40 is to the force-bearing point, the larger the extent of the opening 40 getting smaller is. The elastic element 44 inside the opening 40 is pressed accordingly. Since the elastic element 44 is elastic and capable of getting deformed easily, the whole battery case 4 can then achieve elastic deformation without breaking under the pressure exerted by the bearing deck 1 or fiercely preventing the bearing deck 1 from elastic deforming.

Referring to FIGS. 2 and 3, each side plate part 42 is equipped with several connecting parts 45 for connecting with the bearing deck 1. In this embodiment, the connecting parts 45 are nuts embedded in the side plate part 42. These nuts can be connected with the threaded fastener passing through the bearing deck 1 so that the battery case 4 is assembled under the bearing deck 1.

Figure 4:
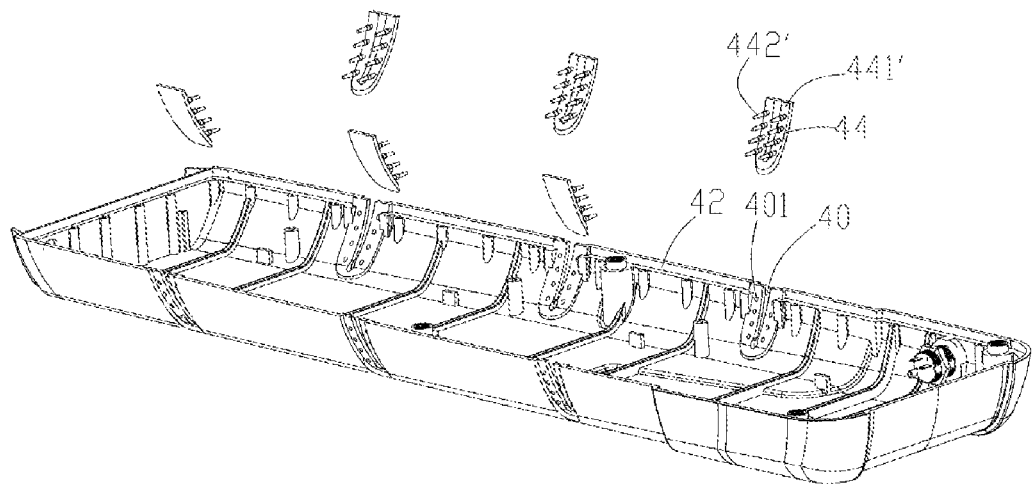
FIG. 4 is the exploded view of the battery case of the second embodiment of this invention.

FIG. 4 shows the exploded view of the battery case of the second embodiment of this invention. The difference between this embodiment and the first embodiment only lies in the elastic element 44'. In this second embodiment, the elastic element 44' is manufactured separately, and is then assembled to the opening 40 of the side plate part 42. The elastic element 44' comprises a main body part 441' and several cylindrical bodies 442' extruding from the main body part 441', wherein each cylindrical body 442' has a protrusion. Each opening 40 has a plurality of through holes 401 at both sides of it. When assembled, the cylindrical bodies 442' of the elastic element 44' are inserted into the corresponding through holes 401 and are fixed by the protrusions.

What is claimed is:

1. A battery case for an electric skateboard, comprising a bottom plate part and two side plate parts extending oppositely from the bottom plate part, wherein each of the side plate parts has at least one opening, in which an elastic element is arranged, wherein the elastic element comprises a main body part and cylindrical bodies extruding from the main body part and having protrusions, and wherein both sides of the opening have through holes, and the main body part is inserted into the through holes and is fixed by the protrusions.

2. The battery case according to claim 1, wherein a connecting part for connecting with the electric skateboard is mounted on the side plate part.

3. The battery case according to claim 1, wherein the battery case comprises two end plate parts, which extend respectively from the two ends of the bottom plate part and connect respectively with the two side plate parts.

4. An electric skateboard, comprising a bearing deck, wheels mounted on both ends of the bearing deck, and an electric motor mounted under the bearing deck, wherein the electric skateboard further comprising the battery case which is mounted under the bearing deck, and comprises a bottom plate part and two side plate parts extending oppositely from the bottom plate part, wherein each of the side plate parts has at least one opening, in which an elastic element is arranged, wherein the elastic element comprises a main body part and cylindrical bodies extruding from the main body part and having protrusions, and wherein both sides of the opening have through holes, and the main body part is inserted into the through holes and is fixed by the protrusions.

5. The electric skateboard according to claim 4, wherein a connecting part for connecting with the bearing deck of the electric skateboard is mounted on the side plate part.

6. The electric skateboard according to claim 4, wherein the battery case comprises two end plate parts, which extend respectively from the two ends of the bottom plate part and connect respectively with the two side plate parts.

\* \* \* \* \*

UNITED STATES PATENT AND TRADEMARK OFFICE
CERTIFICATE OF CORRECTION

PATENT NO. : 9,673,432 B2  
APPLICATION NO. : 14/394794  
DATED : June 6, 2017  
INVENTOR(S) : Yu Tian Page 1 of 1

It is certified that error appears in the above-identified patent and that said Letters Patent is hereby corrected as shown below:

On the Title Page

Item (71), should read as follows:
(71) Applicant: HAOXIANG ELECTRIC ENERGY (KUNSHAN) CO., LTD. Kunshan, Jiangsu, (CN)

Signed and Sealed this
Twentieth Day of February, 2018

Andrei Iancu
*Director of the United States Patent and Trademark Office*